(12) United States Patent
Ellard et al.

(10) Patent No.: US 6,461,525 B2
(45) Date of Patent: Oct. 8, 2002

(54) METHOD FOR BACKWASHING GRANULAR MEDIA FILTERS AND BIOREACTORS

(75) Inventors: Greg Ellard, San Antonio, TX (US); Gary Mann, Largo, FL (US)

(73) Assignee: Tetra Process Technologies, Tampa, FL (US)

( * ) Notice: Subject to any disclaimer, the term of this patent is extended or adjusted under 35 U.S.C. 154(b) by 0 days.

(21) Appl. No.: 09/917,480

(22) Filed: Jul. 28, 2001

(65) Prior Publication Data

US 2002/0036177 A1 Mar. 28, 2002

Related U.S. Application Data

(60) Provisional application No. 60/222,435, filed on Aug. 1, 2000.

(51) Int. Cl.[7] ........................... B01D 24/46; B01D 29/66
(52) U.S. Cl. ........................................ 210/797; 210/798
(58) Field of Search ................................... 210/797, 798

(56) References Cited

U.S. PATENT DOCUMENTS

| | | |
|---|---|---|
| 4,482,461 A | 11/1984 | Hindman et al. |
| 4,643,836 A | 2/1987 | Schmid |
| 4,818,420 A | 4/1989 | Mims |
| 5,112,504 A | 5/1992 | Johnson |
| 5,234,605 A | 8/1993 | Reipur et al. |
| 5,288,398 A | 2/1994 | Angelino |
| 5,464,542 A | 11/1995 | Grienberger et al. |
| 5,476,584 A | 12/1995 | McDougald |
| 5,484,536 A | 1/1996 | Yamaguchi |
| 5,792,373 A | 8/1998 | Bennick et al. |
| 5,833,867 A | 11/1998 | Hensley |
| 5,866,019 A | 2/1999 | Wyness |
| 5,972,228 A | 10/1999 | Ingleman et al. |

OTHER PUBLICATIONS

Fleming & Slack, Trends in Severn Sewer Overflow Management, Water Engineering & Management, Feb. 2001.

*Primary Examiner*—Robert J. Popovics
(74) *Attorney, Agent, or Firm*—Jo Katherine D'Ambrosio

(57) ABSTRACT

A method for removal of solids in a water treatment system having multiple filters, each filter comprising an air backwash system and a water backwash system, comprising a series of steps to enable two filters to be in some stage of the backwash process at the same time thereby reducing the time the filter is out of service. The continuous cycling of the backwash method is characterized by a continuous cycle of backwashing that backwashes two filters simultaneously. The backwashing method requires three steps, an air-only backwash, an air/water bashwash and a water-only or rinse backwash. In this method, as one filter is at the water-only backwash stage, the backwash cycle of a second filter is started so that the second filter is air/water backwashed while the first filter is at the water-only backwashed stage. Depending on the valve actuator used to open and close the backwash air and water valves, each filter in a series of filters is out of the filtration process for only about 2 to 15 minutes, thereby minimizing downtime and disruption of the filtration process necessary to restore the capacity of the filters caused by buildup of solids. This enables the filters to operate at a high level of solid/hydraulic loading such as caused by storm water surges.

19 Claims, 2 Drawing Sheets

METHOD FOR BACKWASHING GRANULAR MEDIA FILTERS AND BIOREACTORS

CROSS REFERENCES TO RELATED CASES

This is a continuation of U.S. Provisional patent application, Ser. No. 60/222,435 filed Aug. 1, 2000, now abandoned.

FIELD OF THE INVENTION

The present invention relates to a method of removing solid material buildup from granular media filters and bioreactors. Particularly, the invention is directed to a method of removing solid material buildup from granular media filters and bioreactors utilizing an air and water backwash system.

BACKGROUND

Communities often build sewer systems that would collect both storm water runoff and sanitary sewage in the same pipe. Combined sewer overflows (CSO) result in overflows that contain not only storm water but also untreated human and industrial waste, toxic materials and debris. Storm waters can also infiltrate or leak into conventional wastewater collection systems. Typically, wastewater treated in granular media filters and bioreactors contain large amounts of solid material. During storm surges, however, the amount of suspended solids increases to a point greater than the capacity of the filter treatment plant. Sewer systems are presently designed to discharge this excess of polluted CSO wastewater directly into nearby streams, rivers, lakes or estuaries. See, *Fleming and Slack, Trends in Sewer Overflow Management, Water Engineering & Management*, February, 2001. During normal operations of wastewater treatment filters, solids collect on the filter media. The collection and buildup of layers of solids on the filter media prevents the wastewater from being in direct contact with the media and therefore reduces removal of solids and BOD from the wastewater. Also, the build-up of solids on the filter causes head loss. The solids form a layer on top of the filter as well as layers on the surfaces of the filter media. This results in head loss and the unit must be cleaned in order to restore optimal performance to the filter again. Air and water backwash is required to effectively remove these solids. During storm surges, wastewater load on treatment filters can increase, for example, from the normal 60 million gallons per day to 360 million per day during a storm surge. Storm surge flows can contain suspended solids up to 500 mg/l which is a 600% increase from normal conditions. Depending on the treatment facility, this overload of solids can shut down the filter.

Typically, the removal of solids from the filter system is discretely accomplished during a backwash process, meaning that a single filter is isolated from the treatment system and the backwash process for the removal of suspended solids is initiated and completed before the next filter is initiated into the process. Further, while a specific filter is removed from the system, remaining filters in the system must handle the additional workload of the isolated element. Several apparatus and methods of backwashing have been taught.

Bennick et al., U.S. Pat. No. 5,792,373 teaches a backwash filter array comprising a "plurality of filter units" each having a housing, a filter element, and inlets and outlets. The process liquid inlet is capable of being switched in order to be connected to either to the process liquid source or the backwash liquid drain. The '373' reference discloses an arrangement where the valves can be arranged to allow filter units to backwash simultaneously, so that filtration capacity and backwash efficiency can be increased.

The Wyness '019' reference discloses a method for backwashing filters in a water treatment plant with clarifier and peripheral filter cells. The reference discloses an apparatus for treating a liquid containing suspended solids comprised of a clarifying vessel and a number of filters positioned around the periphery of the clarifying vessel for receiving and filtering liquid from the clarifier. The '019' reference teaches that a filter may be backwashed by isolating that filter, filling the other filter cells with clarified liquid and draining them into the isolated cell to remove filter media contaminants.

Hensley, U.S. Pat. No. 5,833,867 teaches a system and method for backwashing multiple filtration vessels. The Hensley '867' reference discloses a system of multiple filtration vessels each of which utilizes a common decontaminating backwashing unit or system located on the exterior of the vessels. Each filtration vessel has a filtration screen dividing the vessel into a filter media containing chamber and a filter media free chamber. The decontamination unit is located inside of the filter media containing chamber. The '867' reference also teaches the use of the same dirty process fluid to backwash the filtration media as used to produce the filtered water. Also, Hensley '867' discloses the use of a circulation or contamination separating pump to dislodge contamination on the filter media particles.

None of the above-listed references discuss the problems associated with CSO and infiltration. CSO's discharge contain a variety of pollutants that may adversely affect the receiving water body, including pathogenic microorganisms, viruses, cysts, chemicals and floatable materials. Because of the rapid buildup of solids in the filter during storm surges, traditional methods of backwashing cannot keep up with the surge of wastewater flow and the CSO must be discharged into nearby rivers and streams. Reducing CSO discharge by improved backwashing so that filters can handle greater loads is an object of this invention.

SUMMARY

The present invention relates to an improved method for backwashing granular media treatment systems comprising multiple filters in a continuous cycle. The method of backwashing removes suspended solids from filter media and the filter infrastructure with a reduction of the backwash time required for each filter and a minimum of backwash water used in restoring flow capacity. This allows the filter system to operate at a time of very high solids/hydraulic loading in situations such as storm surges. Reducing the backwash time reduces the time each filter is out of operation so that treatment filters operate more efficiently and are better able to handle the combined sewer overflows produced by the storm surges. One innovative aspect of this backwash method is to reduce the typical air/water backwash time for each filter from about 35 minutes to about 5 minutes or less. To accomplish this reduction of backwash time, the method is characterized by a continuous cycle of backwashing that backwashes two filters simultaneously. Efficient backwashing requires two steps, a first air/water bashwash and a second water-only or rinse backwash. In the preferred method, as one filter is at the air/ water backwash stage, the backwash cycle of a second filter is started so that the second filter is air/water backwashed during the water-only backwashed stage of the previous filter. According to the method of this invention, each filter in a series of filters is out of the filtration process for only about 5 minutes, thereby minimizing downtime and disruption of the filtration process necessary to restore the capacity of the filters caused by buildup of solids. A seamless transition from one filter to another occurs during the backwash stages. This enables the filters to operate at a high level of solid/hydraulic loading. Also the continuous cycling of the backwash process through the filters in a system minimizes the start/stop action on the backwash water pumps and air blowers saving wear and tear on this equipment.

One preferred method for removal of solids in a water treatment system having multiple filters, each filter comprising an air backwash system and a water backwash system, comprises a series of steps to enable two filters to be in some stage of the backwash process at the same time thereby reducing the time the filter is out of service. Not all of the steps are sequential. The steps can comprise:

(a) closing influent valve and effluent valve of initial filter and opening backwash air valve of first or initial filter of series of filters in filter treatment system;
(b) turning on backwash air blowers for air backwash, start air backwash of first or initial filter;
(c) opening backwash water valve and dirty backwash water valve of initial filter;
(d) turning on backwash pumps for water backwash, start air/water backwash;
(e) backwashing initial filter with an air/water backwash;
(f) closing influent and effluent valves of next filter, opening backwash air valve of next filter;
(g) closing air backwash valve on initial filter, start air backwash on next filter;
(h) opening backwash water valve and dirty backwash water valve on next filter, begin air/water backwash of next filter while continuing to backwash initial filter with a water-only backwash;
(i) closing backwash water valve and dirty backwash water valve of initial filter;
(j) opening influent valve and effluent valve of initial filter;
(j) repeat steps (f) to (j) with each filter to be backwashed;
(l) turning off backwash air blowers for air backwash, closing backwash air valve on final filter;
(m) turning off backwash pumps for water backwash and closing backwash water valve and dirty backwash water valve on final filter;
(n) opening influent valve and effluent valve of final filter.

Alternatively the series of steps to backwash a multi-filter treatment system in a continuous cycle can comprise:
a) Closing the influent and effluent valves, and opening the backwash air valve of the initial filter to be backwashed;
b) Opening the backwash water and dirty backwash water valves of the initial filter;
c) Turning on the backwash blowers, beginning air backwash of initial filter;
d) Turning on backwash water pumps and backwashing initial filter with a combined air/water backwash;
e) closing the influent and effluent valves of the next filter to be backwashed and opening backwash air valve of next filter;
f) closing the backwash air valve of the initial filter thereby stopping air backwash of the initial filter and starting air backwashing of next filter;
g) opening the backwash water and dirty backwash water valves of next filter and backwashing the next filter with an air/water backwash while continuing a water-only backwash of the initial filter;
h) closing the backwash water and dirty backwash water valves of the initial filter;
i) opening the influent valve and effluent valve of the initial filter;
j) repeating steps (e) through (I) in a continuous cycle until all filters are backwashed;
k) turning off backwash blower and closing backwash air valve of final filter;
l) turning off backwash water pump and closing backwash water and dirty backwash water valves of final filter;
m) opening influent valve and effluent valve of final filter so that all filters are back in operation.

Using the embodiments of the method of this invention, the backwash time for each filter can be reduced from approximately 35 minutes per filter to a range of 2 to 20 minutes per filter, preferably 2 to 15 minutes, most preferably, 5 minutes or less per filter, depending on the water treatment needs at the time of backwashing. Preferably, the backwash time per filter during a continuous cycle of backwashing a multi-filter system is approximately 5 minutes per filter.

DETAILED DESCRIPTION

The present invention is a method of backwashing a multi-filter wastewater treatment system in continuous cycle to remove waste solids from biological filters and filter media. With the method of this invention, the time needed to clean each filter is considerably lessened thereby minimizing flow interruption throughout the filter system and improving the system's filtration rate during moderate to heavy solids/hydraulic loading. During storm surges, wastewater load on treatment filters caused by combined storm water runoff and sanitary sewage in the same pipe can increase the typical work load on a treatment system, for example, from the normal load of 60 million gals/day to 360 million gal./day. The surges can containing suspended solids up to 500 mg/l up from the normal 10 mg/l. Solids and heavy hydraulic loading can build up to the point of shutting down the filter because the filter cannot expel the solids fast enough by prior backwashing methods. The fast backwashing method of this invention removes the overload of solids. One accomplishment of this method reduces the typical air/water backwash time for each filter from about 35 minutes to about 10 minutes or less. To achieve this reduction of backwash time, the method backwashes two filters simultaneously. Efficient backwashing requires three steps, a short air wash, a combined air backwash and water bashwash and a third water-only backwash. In one preferred continuous cycle backwash method, as one filter is at the water-only backwash stage, the backwash cycle of a second filter is started so that the second filter is air/water backwashed while the first filter is at the water-only backwashed stage. According to the backwashing method of this invention, each filter in a series of filters is out of the filtration process for only about 10 minutes, thereby minimizing downtime needed to backwash because of the buildup of solids and disruption of the filtration process that is necessary to restore the capacity of the filters. Continuous cycle backwashing enables the treatment filter system to operate at very high solids/hydraulic loading and minimizes the stop and start of water pumps and air blowers.

Figure 1:
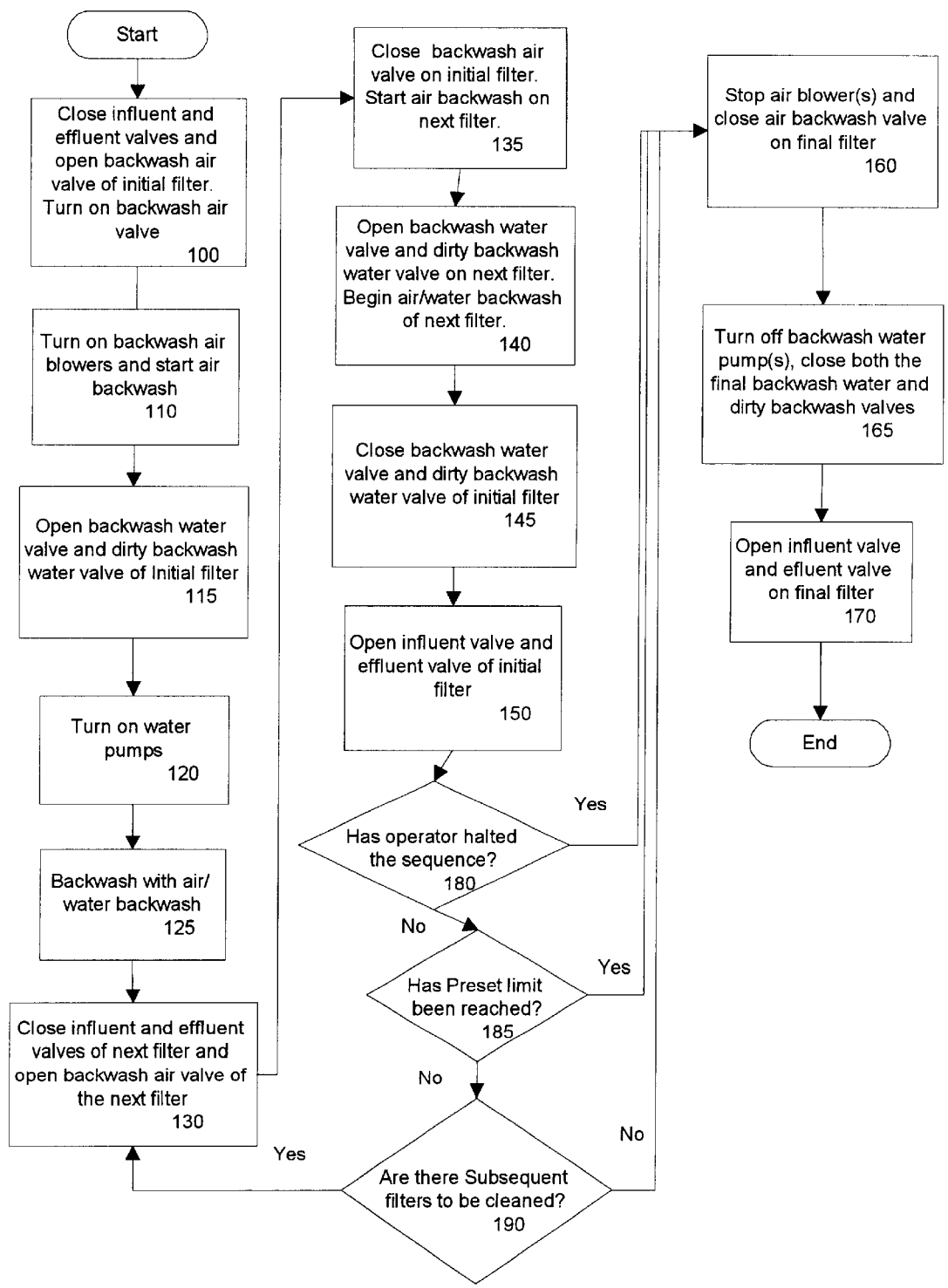
FIG. 1 is a flowchart illustrating one sequence of steps for the backwash method.
Figure 2:
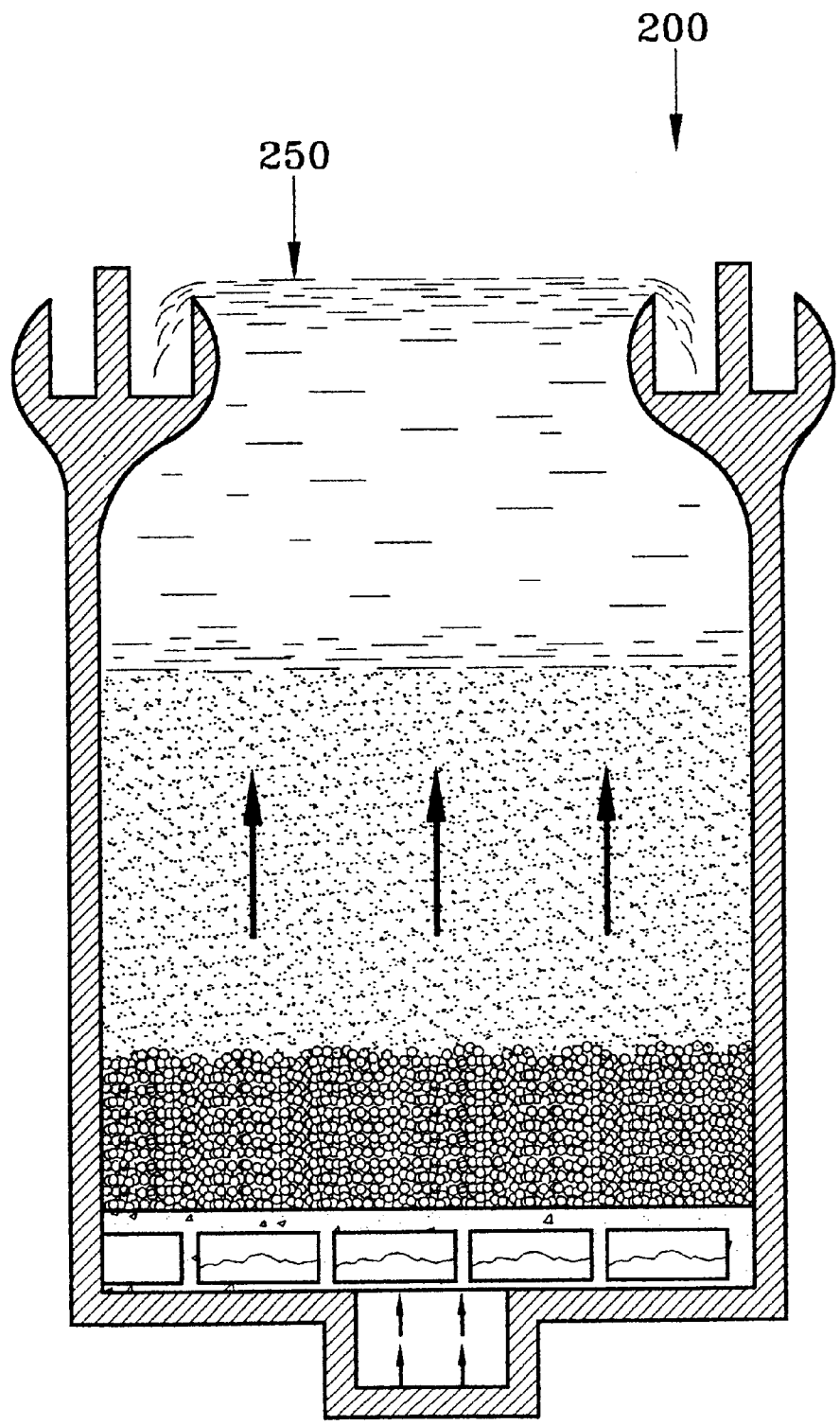
FIG. 2 is a schematic of a filter illustrating the upward flow of backwashing.

The flowchart of FIG. 1 illustrates one preferred method for removal of solids in a water treatment system having multiple filters. Typcial filter treatment systems can have anywhere between 2 to 30 filters, each filter 200 comprising an air backwash system and a water backwash system as seen in FIG. 2. The first step 100 of this method comprises closing the influent valve and effluent valve of the initial, or first filter 200 in a filter treatment system, to get the filter off line. This shuts off the influent wastewater supply and stops effluent flow. The backwash air valve of initial filter is opened at this time. Several types of automatic valve openers can be used to open filter valves. One preferred valve opener is a fluid actuated valve opener, either air or other gas in a pneumatic valve opener or hydraulic fluids for a hydraulic valve opener. Alternatively, an electrically actuated valve opener can be used, although pneumatic or hydraulic valve openers are preferred because they are faster thereby saving time during the backwash process. The valve openers and electrical equipment that turn the backwashwater pumps and backwash air blowers on and off are controlled by a controller programmed by an operator so that the entire backwash system is automated.

During the next step, 110 the backwash air blowers are turned on for air backwash. In this method, one set of air blowers can be used to air backwash all the filters in a treatment system. Since the backwash air valve is already opened, turning on the air blowers starts the air backwashing of the initial filter started. Air backwashing breaks up and foams the captured suspended solids so that they become suspended in the backwash water and float to the top and out over the weir of the filter 250. The next step 115 comprises opening the backwash water valve and the dirty backwash water valve of the initial filter. The backwash pumps for water backwash are turned on 120 and the air/water backwash begins. The initial filter is than backwashed with an air/water backwash 125. The air/water backwash scrubs the filter media and the filter underdrain system and carries the waste solids out of the filter. The influent and effluent valves of next filter are then closed 130, taking the next filter out of filter treatment system and the backwash air valve of the next filter is opened 130.

The air backwash valve on initial filter is then closed starting the air backwash on next filter since that valve was opened 135 during the previous step. The backwash water valve and dirty backwash water valve on next filter are opened 140 to begin an air/water backwash of next filter while continuing to backwash the initial filter with a water-only backwash. The water-only phase of backwash serves to rinse the filter media and remove much of the remaining suspended solid material. In one embodiment, one backwash water pump services all the filters within a treatment system. When one water pump is used, two filters are backwashed with one pump with the aid of flow control devices. Alternatively, a system can use two or more backwash water pumps so that each filter can have its own water pump during the phase when two filters are being backwashed simultaneously. After the initial filter is backwashed, the backwash water valve and dirty backwash water valve of initial filter are closed 145. The filter is ready to go back into service and the influent valve and effluent valve of initial filter are opened 150.

After the completion of the backwash of each filter, the automated method goes through a sequence of queries which determines if subsequent filters are to be backwashed. The first query is: has the operated halted the backwash process 180? If yes, the air blowers are stopped 160 and air backwash valves closed 160. Then after completion of the water only rinse, the backwash water pump is then turned off and both the backwash water valve and dirty backwash water valve of the last filter to be backwashed are closed 165. Finally the influent and effluent valves on the final filter are opened 170 and the filter is put back in operation.

The second query is: has the operator designated a preset limit of elapsed time or number of filters to be backwashed 185? If yes, the cycle ends and the backwash process goes through its final steps of finishing the final filter and putting it back into operation. If no preset limit has been reached the backwash cycle continues with backwashing the next filter in the series. The final query is: are there any further filters scheduled to be cleaned 190? The backwashing process ends when the last scheduled filter in the system is backwashed. Until one of these queries is answered positively, the steps of closing off the influent and effluent valves and opening and closing the backwash air valves and backwash water and dirty water valves are repeated until each filter is backwashed. If the a query is answered yes, the final steps of the backwash method are put in place, the backwash air blowers for air backwash are turned off and the backwash air valve on the final filter is closed. After, the water-only backwash, the backwash pump or pumps for water backwash are turned off and the backwash water valve and dirty backwash water valve on the final filter are closed. Opening the influent valve and the effluent valve of final filter puts the entire treatment system back in filtering operation.

The timing of the sequence of steps of the continuous cycle of backwashing is critical to completing backwashing of a filter treatment system as quickly as possible under the storm surge or other conditions requiring fast backwashing to maintain good filtration rates during moderate to heavy solids/hydraulic loading. Preferably, the complete backwashing of each filter with both an air backwash and water backwash is completed within a time range of 2 minutes to 20 minutes per filter, preferably, 2 minutes to 15 minutes. In one preferred method, depending on the age of the valves, (old valves may be slower to open and close) and size of the valves, (smaller valves open and close faster than larger valves) the backwash sequence is completed in 4 minutes to 6 minutes, and preferably in 5 minutes.

One preferred method for removal of solids in a water treatment system having multiple filters utilizing an electrically actuated valve opener comprises the following sequence:

(a) closing influent valve and effluent valve of initial filter and opening backwash air valve of initial filter within a time range of 10 seconds to 60 seconds;

(b) turning on backwash air blowers for air backwash and starting air backwash of initial filter within a time range of 2 seconds to 30 seconds;

(c) opening backwash water valve and dirty backwash water valve of initial filter within a time range of 10 seconds to 60 seconds;

(d) turning on backwash pumps for water backwash and backwashing initial filter with air/water backwash within a time range of 120 seconds to 600 seconds;

(e) closing influent valve and effluent valve of next filter, opening backwash air valve of next filter within a time range of 10 seconds to 60 seconds;

(f) closing backwash air valve of initial filter and starting air backwash of next filter within a time range of 10 seconds to 60 seconds;

(g) opening backwash water valve and dirty backwash water valve on next filter and backwashing next filter with air/water backwash within a time range of 120 seconds to 600 seconds while simultaneously backwashing the initial filter with a water only backwash within the time range of 120 seconds to 600 seconds;

(h) closing backwash water valve and dirty backwash water valve of initial filter within a time range of 10 seconds to 60 seconds;

(l) opening influent valve and effluent valve of initial filter within a time range of 10 seconds to 60 seconds;

(j) repeating steps (e) to (i) with each filter to be backwashed;

(k) turning off backwash air blowers for air backwash and closing backwash air valve on final filter within a time range of 10 seconds to 60 seconds;

(m) backwashing final filter with a water-only backwash for a time range of 120 seconds to 600 seconds;

(n) turning off backwash pumps for water backwash and closing backwash water valve and dirty backwash water valve on final filter within a time range of 10 seconds to 60 seconds;

(o) opening influent valve and effluent valve of final filter within a time range of 10 seconds to 60 seconds.

An alternative method for removal of solids in a water treatment system having multiple filters using a pneumatic or hydraulic actuated valve opener is faster than electrically actuated valve opener. The alternative method comprises a timing sequence as follows:

| | |
|---|---|
| closing influent valve and effluent valve of initial filter and opening backwash air valve of initial filter | 2 seconds to 30 seconds; |
| turning on backwash air blowers to start air backwash of initial filter | 2 seconds to 30 seconds; |
| opening backwash water valve and dirty backwash water valve of initial filter | 2 seconds to 30 seconds; |
| turning on backwash pumps for water backwash and backwashing initial filter with air/water backwash | 120 seconds to 600 seconds; |
| closing influent and effluent valves of next filter, opening backwash air valve of next filter | 2 seconds to 30 seconds; |
| closing backwash air valve of initial filter and starting air backwash of next filter | 2 seconds to 30 seconds; |
| opening backwash water valve and dirty backwash water valve on next filter and backwashing next filter with air/water backwash (while simultaneously backwashing the initial filter with a water only backwash within this time range); | 120 seconds to 600 seconds; |
| closing backwash water valve and dirty backwash water valve of initial filter | 2 seconds to 30 seconds; |
| opening influent valve and effluent valve of initial filter | 2 seconds to 30 seconds; |
| repeating the backwash process with each filter to be backwashed; | |
| turning off backwash air blowers for air backwash and closing backwash air valve on final filter | 2 seconds to 30 seconds; |
| backwashing final filter with a water-only backwash | 120 seconds to 600 seconds; |
| turning off backwash pumps for water backwash and closing backwash water valve and dirty backwash water valve on final filter | 2 seconds to 30 seconds; |
| opening influent valve and effluent valve of final filter | 2 seconds to 30 seconds; |

In one preferred method, the opening of the influent and effluent valves for each filter is performed within a time range of 4–6 seconds and the closing of the influent and effluent valves for each filter is performed within a time range of 4–6 seconds. The opening of the backwash air valve for each filter is performed within a time range of 4–6 seconds and the closing of the backwash air valve for each filter is performed within a time range of 4–6 seconds. The opening of the backwash water valve and dirty backwash water valve for each filter is performed within a time range of 4–6 seconds and the closing of the backwash water valve and dirty backwash water valve for each filter is performed within a time range of 4–6 seconds. As valves age, they may move more slowly.

In this preferred method, the turning on the backwash air blower and starting the air backwash of each filter is performed within a time range of 4–6 seconds and the closing of the backwash air valve of the initial filter and starting the air backwash of the next filter is performed within a time range of 4–6 seconds. Turning on the backwash pumps for water backwash and backwashing each filter with an air/water backwash is performed within a preferred time range of 200–300 seconds and the backwashing of each filter with a water-only backwash of the previous filter is simultaneous to the air/water backwash of the next filter and is performed within a preferred time range of 200–300 seconds. Closing of the backwash water valve and dirty backwash water valve for the final filter and turning off the backwash pumps for water backwash is performed within a time range of 4–6 seconds.

In a more preferred method of backwashing, opening and closing any pneumatically controlled valve takes about 5 seconds. The process of air/water backwashing takes approximately a total of ten minutes, five minutes of air/water backwash and five minutes of a rinsing or water-only backwash. However, the process progresses to the next filter every five minutes with five minutes overlapping so that a twelve filter system can be air/water backwashed in sixty five minutes with the extra five minutes used for the final rinse cycle. Backwash flows to two filters are occurring at most times during this process. Two or more backwash water pumps can be used with stand pipe piping to direct backwash water to two or more filters.

Below are the results of experimentation comparing the backwashing methods of this invention to prior methods of backwashing.

TABLE 1

New Method Compared to Prior Procedure of Backwashing filters

| Amount of Time Backwash Performed | Amount of Filtration Performed Before an Overflow Occurred |
|---|---|
| A 1-hour long backwash performed | 4 hrs. and 40 min. |
| A 30-minute long backwash performed | 4 hrs. (approximate) |
| A 10-minute long backwash comprising a **5 minute air/water backwash followed by 5 minute water only backwash. | 3 hrs. |

**One preferred method of backwash as disclosed in this invention.

Even the shorter ten-minute backwash extended the filtration run by 3 hours thereby decreasing downtime of the filters required by the backwashing process but maintaining a similar filtration duration as the longer 30 minute or 1 hour backwash. The real time sequence of backwashing according to the method of this invention is described below.

TABLE 2

Field Data: Comparison of Speedwash to Conventional Backwash Two side by side filters were used during filtration process, the first for backwash, the second for filtration. Backwashed #1–20 minutes of air and water, filtered slowly through #2

| Elapsed Time Hrs/Mins | Action |
|---|---|
| 0:00–0:25 | Complete regular (25 minutes) backwash of filter #1 and #2; place filters back on line |
| 4:40 | Both filter #1 and filter #2 are overflowing (blocked with solids) Backwash both filters with a 10 minute backwash (5 min. air/wash wash followed water-only rinse) |
| 7:40 | Filter #1 overflowing again |

The short 10 minute backwash extended the filtration capacity of the filters for three hours with a brief downtime.

What is claimed is:

1. A method for removal of solids in a water treatment system having multiple filters, each filter comprising an air backwash system and a water backwash system, the method comprising:
    (a) closing influent valve and effluent valve of initial filter and opening backwash air valve of initial filter;
    (b) turning on backwash air blowers for air backwash, start air backwash of initial filter;
    (c) opening backwash water valve and dirty backwash water valve of initial filter;
    (d) turning on backwash pumps for water backwash, start air/water backwash;
    (e) backwashing initial filter with an air/water backwash;
    (f) closing influent and effluent valves of next filter, opening backwash air valve of next filter;
    (g) closing air backwash valve on initial filter to stop air backwash of the initial filter, start air backwash on next filter;
    (h) opening backwash water valve and dirty backwash water valve on next filter, begin air/water backwash of next filter while continuing to backwash initial filter with a water-only backwash;
    (i) closing backwash water valve and dirty backwash water valve of initial filter;
    (j) opening influent valve and effluent valve of initial filter;
    (k) repeat steps (f) to (j) with each filter to be backwashed;
    (l) turning off backwash air blowers for air backwash, closing backwash air valve on final filter;
    (m) turning off backwash pumps for water backwash and closing backwash water valve and dirty backwash water valve on final filter;
    (n) opening influent valve and effluent valve of final filter.

2. A method for removal of solids in a water treatment system having multiple filters, each filter comprising an air backwash system and a water backwash system and an electrically actuated valve opener, the method comprising:
    (a) closing influent valve and effluent valve of initial filter and opening backwash air valve of initial filter within a time range of 10 seconds to 60 seconds;
    (b) turning on backwash air blowers for air backwash and starting air backwash of initial filter within a time range of 2 seconds to 30 seconds;
    (c) opening backwash water valve and dirty backwash water valve of initial filter within a time range of 10 seconds to 60 seconds;
    (d) turning on backwash pumps for water backwash and backwashing initial filter with air/water backwash within a time range of 120 seconds to 600 seconds;
    (e) closing influent valve and effluent valve of next filter, opening backwash air valve of next filter within a time range of 10 seconds to 60 seconds;
    (f) closing backwash air valve of initial filter to stop air backwash of initial filter and starting air backwash of next filter within a time range of 10 seconds to 60 seconds;
    (g) opening backwash water valve and dirty backwash water valve on next filter and backwashing next filter with air/water backwash within a time range of 120 seconds to 600 seconds while simultaneously backwashing the initial filter with a water only backwash within the time range of 120 seconds to 600 seconds;
    (h) closing backwash water valve and dirty backwash water valve of initial filter within a time range of 10 seconds to 60 seconds;
    (i) opening influent valve and effluent valve of initial filter within a time range of 10 seconds to 60 seconds;
    (j) repeating steps (e) to (i) with each filter to be backwashed;
    (k) turning off backwash air blowers for air backwash and closing backwash air valve on final filter within a time range of 10 seconds to 60 seconds;
    (l) backwashing final filter with a water-only backwash for a time range of 120 seconds to 600 seconds;
    (m) turning off backwash pumps for water backwash and closing backwash water valve and dirty backwash water valve on final filter within a time range of 10 seconds to 60 seconds;
    (n) opening influent valve and effluent valve of final filter within a time range of 10 seconds to 60 seconds.

3. A method for removal of solids in a water treatment system having multiple filters, each filter comprising an air backwash system and a water backwash system, the method comprising:
    (a) closing influent valve and effluent valve of first filter and opening backwash air valve of first filter;
    (b) turning on backwash air blowers for air backwash, start air backwash of first filter;
    (c) opening backwash water valve and dirty backwash water valve of first filter;
    (d) turning on backwash pumps for water backwash, start air/water backwash of first filter;
    (e) closing influent and effluent valves of next filter, opening backwash air valve of next filter;
    (f) closing air backwash valve on first filter to stop air backwash of first filter, start air backwash on next filter;
    (g) opening backwash water valve and dirty backwash water valve on next filter, starting air/water backwash of next filter continuing to backwash first filter with a water-only backwash;
    (h) closing backwash water valve and dirty backwash water valve of first filter;
    (i) opening influent valve and effluent valve of first filter;
    (j) repeat steps (e) to (i) with each filter to be backwashed;
    (k) turning off backwash air blowers for air backwash and closing backwash air valve on final filter;
    (l) turning off backwash pumps for water backwash and closing backwash water valve and dirty backwash water valve on final filter;

(m) opening influent valve and effluent valve of final filter. wherein the air/water backwashing of each filter is completed within a time range of 2 minutes to 15 minutes per filter.

4. A method for removal of solids in a water treatment system having multiple filters, each filter comprising an air backwash system and a water backwash system and a pneumatic actuated valve opener, the method comprising the steps of:

(a) closing influent valve and effluent valve of initial filter and opening backwash air valve of initial filter within a time range of 2 seconds to 30 seconds;

(b) turning on backwash air blowers to start air backwash of initial filter within a time range of 2 seconds to 30 seconds;

(c) opening backwash water valve and dirty backwash water valve of initial filter within a time range of 2 seconds to 30 seconds;

(d) turning on backwash pumps for water backwash and backwashing initial filter with air/water backwash within a time range of 120 seconds to 600 seconds;

(e) closing influent and effluent valves of next filter, opening backwash air valve of next filter within a time range of 2 seconds to 30 seconds;

(f) closing backwash air valve of initial filter and starting air backwash of next filter within a time range of 2 seconds to 30 seconds;

(g) opening backwash water valve and dirty backwash water valve on next filter and backwashing next filter with air/water backwash within a time range of 120 seconds to 600 seconds while simultaneously backwashing the initial filter with a water only backwash within this time range;

(h) closing backwash water valve and dirty backwash water valve of initial filter within a time range of 2 seconds to 30 seconds;

(i) opening influent valve and effluent valve of initial filter within a time range of 2 seconds to 30 seconds;

(j) repeating steps (e) to (i) with each filter to be backwashed;

(k) turning off backwash air blowers for air backwash and closing backwash air valve on final filter within a time range of 2 seconds to 30 seconds;

(l) backwashing final filter with a water-only backwash for a time range of 120 seconds to 600 seconds;

(m) turning off backwash pumps for water backwash and closing backwash water valve and dirty backwash water valve on final filter within a time range of 2 seconds to 30 seconds;

(n) opening influent valve and effluent valve of final filter within a time range of 2 seconds to 30 seconds.

5. The method of claim 4 wherein the opening of the influent and effluent valves for each filter is performed within a time range of 4–6 seconds.

6. The method of claim 4 wherein the closing of the influent and effluent valves for each filter is performed within a time range of 4–6 seconds.

7. The method of claim 4 wherein the opening of the backwash air valve for each filter is performed within a time range of 4–6 seconds.

8. The method of claim 4 wherein the closing of the backwash air valve for each filter is performed within a time range of 4–6 seconds.

9. The method of claim 4 wherein the opening of the backwash water valve and dirty backwash water valve for each filter is performed within a time range of 4–6 seconds.

10. The method of claim 4 wherein the closing of the backwash water valve and dirty backwash water valve for each filter is performed within a time range of 4–6 seconds.

11. The method of claim 4 wherein turning on the backwash air blower and starting the air backwash of each filter is performed within a time range of 4–6 seconds.

12. The method of claim 4 wherein closing of the initial backwash air valve and starting the air backwash of the next filter is performed within a time range of 4–6 seconds.

13. The method of claim 4 wherein turning on the backwash pumps for water backwash and backwashing each filter with an air/water backwash is performed within a time range of 200–300 seconds.

14. The method of claim 4 wherein the backwashing of each filter with a water-only backwash is performed within a time range of 200–300 seconds.

15. The method of claim 4 wherein turning off the backwash air blower and closing the air backwash valve is performed within a time range of 4–6 seconds.

16. The method of claim 4 wherein closing of the backwash water valve and dirty backwash water valve for the final filter and turning off the backwash pumps for water backwash is performed within a time range of 4–6 seconds.

17. A method for removal of solids in a water treatment system having multiple filters, each filter comprising an air backwash system and a water backwash system and a fluid actuated valve opener, the method comprising the steps of:

(a) closing influent valve and effluent valve of initial filter and opening backwash air valve of initial filter within a time range of 2 seconds to 30 seconds;

(b) turning on backwash air blowers and starting air backwash of initial filter within a time range of 2 seconds to 30 seconds;

(c) opening backwash water valve and dirty backwash water valve of initial filter within a time range of 2 seconds to 30 seconds;

(d) turning on backwash pumps for water backwash and backwashing initial filter with air/water backwash within a time range of 120 seconds to 600 seconds;

(e) closing influent and effluent valves of next filter, opening backwash air valve of next filter within a time range of 2 seconds to 30 seconds;

(f) closing backwash air valve of initial filter and starting air backwash on next filter within a time range of 2 seconds to 30 seconds;

(g) opening backwash water valve and dirty backwash water valve on next filter and backwashing next filter with air/water backwash within a time range of 120 seconds to 600 seconds while simultaneously backwashing the initial filter with a water only backwash within this time range;

(h) closing backwash water valve and dirty backwash water valve of initial filter within a time range of 2 seconds to 30 seconds;

(i) opening influent valve and effluent valve of initial filter within a time range of 2 seconds to 30 seconds;

(j) repeating steps (e) to (i) with each filter to be backwashed;

(k) turning off backwash air blowers for air backwash and closing backwash air valve on final filter within a time range of 2 seconds to 30 seconds;

(l) backwashing final filter with a water-only backwash for a time range of 120 seconds to 600 seconds;

(m) turning off backwash pumps for water backwash and closing backwash water valve and dirty backwash water valve on final filter within a time range of 2 seconds to 30 seconds;

(n) opening influent valve and effluent valve of final filter within a time range of 2 seconds to 30 seconds.

18. The method of claim 17 wherein the method is adapted for use with hydraulic actuated valve openers.

19. A method for removal of solids in a water treatment system having multiple filters, each filter comprising an air backwash system and a water backwash system and a fluid actuated valve opener, the method comprising the steps of:

(a) closing the influent and effluent valves, and opening the backwash air valve of the initial filter to be backwashed;

(b) opening the backwash water and dirty backwash water valves of the initial filter;

(c) turning on the backwash blowers, beginning air backwash of initial filter;

(d) turning on backwash water pumps and backwashing initial filter with a combined air/water backwash;

(e) closing the influent and effluent valves of the next filter to be backwashed and opening backwash air valve of next filter;

(f) closing the backwash air valve of the initial filter thereby stopping air backwash of the initial filter and starting air backwashing of next filter;

(g) opening the backwash water and dirty backwash water valves of next filter and backwashing the next filter with an air/water backwash while continuing a water-only backwash of the initial filter;

(h) closing the backwash water and dirty backwash water valves of the initial filter;

(i) opening the influent valve and effluent valve of the initial filter;

(j) repeating steps (e) through (i) in a continuous cycle until all desired filters are backwashed;

(k) turning off backwash blower and closing backwash air valve of final filter;

(l) turning off backwash water pump and closing backwash water and dirty backwash water valves of final filter; (m) opening influent valve and effluent valve of final filter so that all filters are back in operation.

* * * * *